US012711866B2

(12) United States Patent
Sakagawa et al.

(10) Patent No.: US 12,711,866 B2
(45) Date of Patent: Aug. 18, 2026

(54) ASSISTANCE CONTROLLING APPARATUS, ASSISTANCE CONTROLLING METHOD, AND COMPUTER-READABLE STORAGE MEDIUM

(71) Applicant: HONDA MOTOR CO., LTD., Tokyo (JP)

(72) Inventors: Yuta Sakagawa, Saitama (JP); Takahiro Kurehashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 119 days.

(21) Appl. No.: 18/783,452

(22) Filed: Jul. 25, 2024

(65) Prior Publication Data

US 2025/0046191 A1 Feb. 6, 2025

(30) Foreign Application Priority Data

Jul. 31, 2023 (JP) ................................ 2023-124353

(51) Int. Cl.

| | |
|---|---|
| ***G08G 1/16*** | (2006.01) |
| ***B60R 21/34*** | (2011.01) |
| ***G08G 1/005*** | (2006.01) |
| ***G08G 1/01*** | (2006.01) |
| ***G08G 1/09*** | (2006.01) |

(52) U.S. Cl.

CPC ............. *G08G 1/166* (2013.01); *B60R 21/34* (2013.01); *G08G 1/005* (2013.01); *G08G 1/093* (2013.01); *G08G 1/0104* (2013.01)

(58) Field of Classification Search

CPC ........ G08G 1/166; G08G 1/005; G08G 1/093; G08G 1/0104; B60R 21/34

See application file for complete search history.

(56) References Cited

U.S. PATENT DOCUMENTS 8,725,309 B2 * 5/2014 Kubotani ............... G08G 1/166 701/1
11,086,321 B2 * 8/2021 Matsui ............ B60W 60/00253

(Continued)

FOREIGN PATENT DOCUMENTS

DE 102014110958 A1 * 4/2015 ............. B60Q 5/006
JP 2008310376 A * 12/2008 ............... G08G 1/16

(Continued)

OTHER PUBLICATIONS

Translation of JP-2008, 13 pages (Year: 2008).*

(Continued)

*Primary Examiner* — Dale W Hilgendorf

(57) ABSTRACT

An assistance controlling apparatus includes: an acquiring unit which acquires position information of a plurality of user terminals; an identifying unit which identifies, among the plurality of user terminals, a first user terminal and a second user terminal which are moving at a distance of a predetermined value or less from each other, based on a history of position information of the plurality of user terminals; and an assistance controlling unit which performs control related to assistance for a traffic participant when one of the first user terminal or the second user terminal is detected to move to an opposite side of a road with respect to a position of another of the first user terminal or the second user terminal.

17 Claims, 9 Drawing Sheets

(56) References Cited

U.S. PATENT DOCUMENTS

| | | | | |
|---|---|---|---|---|
| 2009/0160678 | A1* | 6/2009 | Turnbull | B60Q 1/547<br>340/944 |
| 2010/0076621 | A1* | 3/2010 | Kubotani | G08G 1/166<br>701/1 |
| 2018/0211116 | A1* | 7/2018 | Modi | G06F 16/7867 |
| 2020/0019161 | A1* | 1/2020 | Stenneth | B60W 60/0059 |
| 2025/0042427 | A1* | 2/2025 | Sakagawa | G08G 1/005 |
| 2025/0046093 | A1* | 2/2025 | Kurehashi | G08G 1/0133 |
| 2025/0046094 | A1* | 2/2025 | Kurehashi | G06T 7/70 |

FOREIGN PATENT DOCUMENTS

| | | | | |
|---|---|---|---|---|
| JP | 2009252022 A | | 10/2009 | |
| WO | 2008126389 A1 | | 10/2008 | |
| WO | WO-2010037823 A1 | * | 4/2010 | G08G 1/163 |
| WO | WO-2019240062 A1 | * | 12/2019 | G08G 1/005 |

OTHER PUBLICATIONS

Translation of WO-2010037823-A1, 15 pages (Year: 2010).*
Translation of DE-102014110958-A1, 17 pages (Year: 2015).*
Translation of WO-2019240062-A1, 45 pages (Year: 2019).*

* cited by examiner

| ID | TIME | POSITION INFORMATION |
|---|---|---|
| ID1 | TIME 1 | POSITION 1 |
| ⋮ | ⋮ | ⋮ |
| ID2 | TIME 2 | POSITION 2 |
| ⋮ | ⋮ | ⋮ |

FIG.4

| FIRST ID | SECOND ID | INTERPERSONAL RELATIONSHIP | DEGREE OF COMPANIONSHIP |
|---|---|---|---|
| ID1 | ID2 | PARENT AND CHILD | HIGHEST |
| ID1 | ID3 | FAMILY | HIGH |
| ID1 | ID4 | FRIEND | HIGH |
| ⋮ | ⋮ | ⋮ | ⋮ |

*FIG.5*

| FIRST ID | SECOND ID | SEPARATION POINT | SEPARATION TIME PERIOD |
|---|---|---|---|
| ID1 | ID2 | POINT 1 | TIME PERIOD 1 |
| ID1 | ID3 | POINT 2 | TIME PERIOD 2 |
| ⋮ | ⋮ | ⋮ | ⋮ |

*FIG.6*

ASSISTANCE CONTROLLING APPARATUS, ASSISTANCE CONTROLLING METHOD, AND COMPUTER-READABLE STORAGE MEDIUM

The contents of the following patent application(s) are incorporated herein by reference: NO. 2023-124353 filed in JP on Jul. 31, 2023.

BACKGROUND

1. Technical Field

The present invention relates to an assistance controlling apparatus, an assistance controlling method, and a computer-readable storage medium.

2. Related Art

In recent years, efforts have been intensified to provide access to a sustainable transportation system with consideration given to even vulnerable people among other traffic participants. To realize this, research and development has been focused on to even further improve traffic safety and convenience through research and development regarding a preventive safety technology. Patent Documents 1 to 3 describe technologies regarding crossing a road or running out into a road by pedestrians.

PRIOR ART DOCUMENTS

Patent Documents

Patent Document 1: International Publication No. 2008/126389

Patent Document 2: Japanese Patent Application Publication No. 2009-252022

Patent Document 3: Japanese Patent Application Publication No. 2008-310376

BRIEF DESCRIPTION OF THE DRAWINGS

FIG. 4 shows one example of a data structure of position history information of a user terminal 82.

FIG. 5 shows one example of a data structure of interpersonal relationship information.

FIG. 6 shows one example of a data structure of separation point information.

DESCRIPTION OF EXEMPLARY EMBODIMENTS

Hereinafter, the present invention will be described by way of embodiments of the invention, however, the following embodiments are not for limiting the invention according to the claims. In addition, not all of the combinations of features described in the embodiments are essential to the solving means of the invention.

Figure 1:
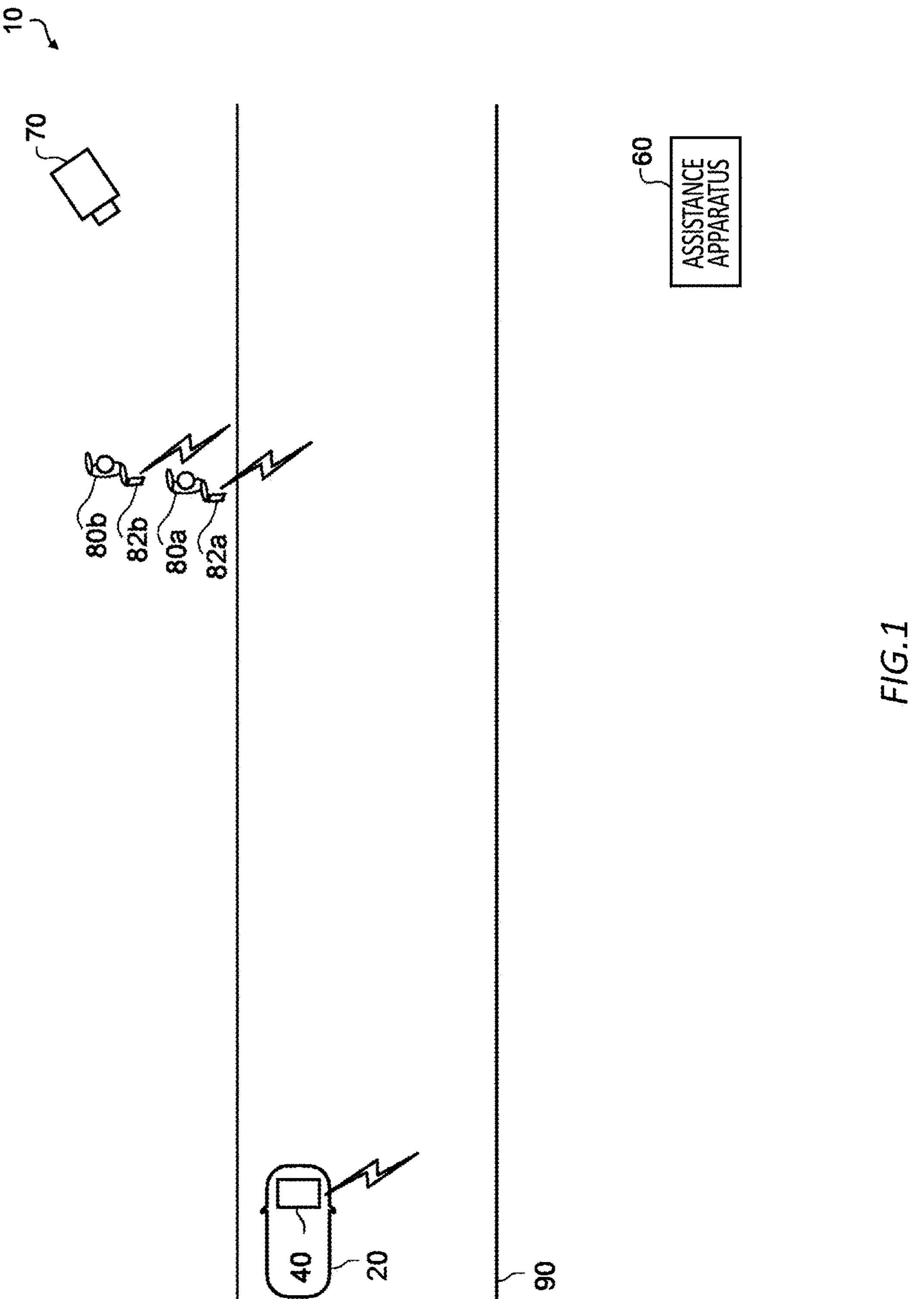
FIG. 1 schematically shows a usage scene of an assistance system 10.

FIG. 1 schematically shows a usage scene of an assistance system 10. The assistance system 10 includes a vehicle 20, a user terminal 82*a* and a user terminal 82*b*, an assistance apparatus 60, and an image-capturing apparatus 70.

The vehicle 20 includes an in-vehicle processing apparatus 40. The user terminal 82*a* is carried by a user 80*a*, and the user terminal 82*b* is carried by a user 80*b*. In the present embodiment, the user 80*a* and the user 80*b* are pedestrians.

In the present embodiment, the user terminal 82*a* and the user terminal 82*b* may be collectively referred to as a "user terminal 82". The user 80*a* and the user 80*b* may be collectively referred to as a "user 80".

The vehicle 20 is traveling on a road 90. The vehicle 20 is one example of a moving object. The in-vehicle processing apparatus 40 has a function of communicating with an outside by using mobile communication. The in-vehicle processing apparatus 40 include sensors such as a position sensor including a global navigation satellite system (GNSS) receiver, a speed sensor such as a vehicle speed sensor, and a ranging sensor which measures a distance from the vehicle 20 to a surrounding object. The in-vehicle processing apparatus 40 has a function of processing information acquired by various kinds of sensors included in the in-vehicle processing apparatus 40, and a function of communicating with the assistance apparatus 60. The in-vehicle processing apparatus 40 provides an advanced driver-assistance systems (ADAS) function of the vehicle 20.

The user terminal 82 is, for example, a mobile terminal such as a smartphone. The user terminal 82 is one example of the moving object. The user terminal 82 periodically transmits, to the assistance apparatus 60, current position information of the user terminal 82 detected by a position sensor including the GNSS receiver.

The image-capturing apparatus 70 is an image-capturing apparatus provided on traffic infrastructure. The image-capturing apparatus 70 acquires positions of the vehicle 20 and the user 80 present within an image-capturing range of the image-capturing apparatus 70 by analyzing captured images, and transmits, to the assistance apparatus 60, the acquired positions of the vehicle 20 and the user 80.

The assistance apparatus 60 receives information transmitted from the in-vehicle processing apparatus 40, the user terminal 82, and the image-capturing apparatus 70 through the mobile communication. The assistance apparatus 60 may receive the information transmitted from the in-vehicle processing apparatus 40, the user terminal 82, and the image-capturing apparatus 70 through the mobile communication as well as a communication line such as Internet and a dedicated line. The assistance apparatus 60 provides traffic assistance for a traffic participant based on information received from the in-vehicle processing apparatus 40, the user terminal 82, and the image-capturing apparatus 70.

In the present embodiment, the assistance apparatus 60 assumes that the user 80*a* is present within a predetermined range from a position of the user terminal 82*a*, and assumes that the user 80*b* is present within a predetermined range from a position of the user terminal 82*b*. The assistance apparatus 60 determines that the user terminal 82*a* and the user terminal 82*b* are moving at a predetermined distance or less from each other based on a history of position information of the user terminal 82*a* and the user terminal 82*b*. The assistance apparatus 60 considers that the user 80*a* and the user 80*b* are moving in conjunction with each other when the user terminal 82*a* and the user terminal 82*b* are moving at the predetermined distance or less from each other. Therefore, the assistance apparatus 60 provides the traffic assistance according to displacement of one of the user terminal 82*a* or the user terminal 82*b*, based on a position of another of the user terminal 82*a* or the user terminal 82*b*.

Figure 2:
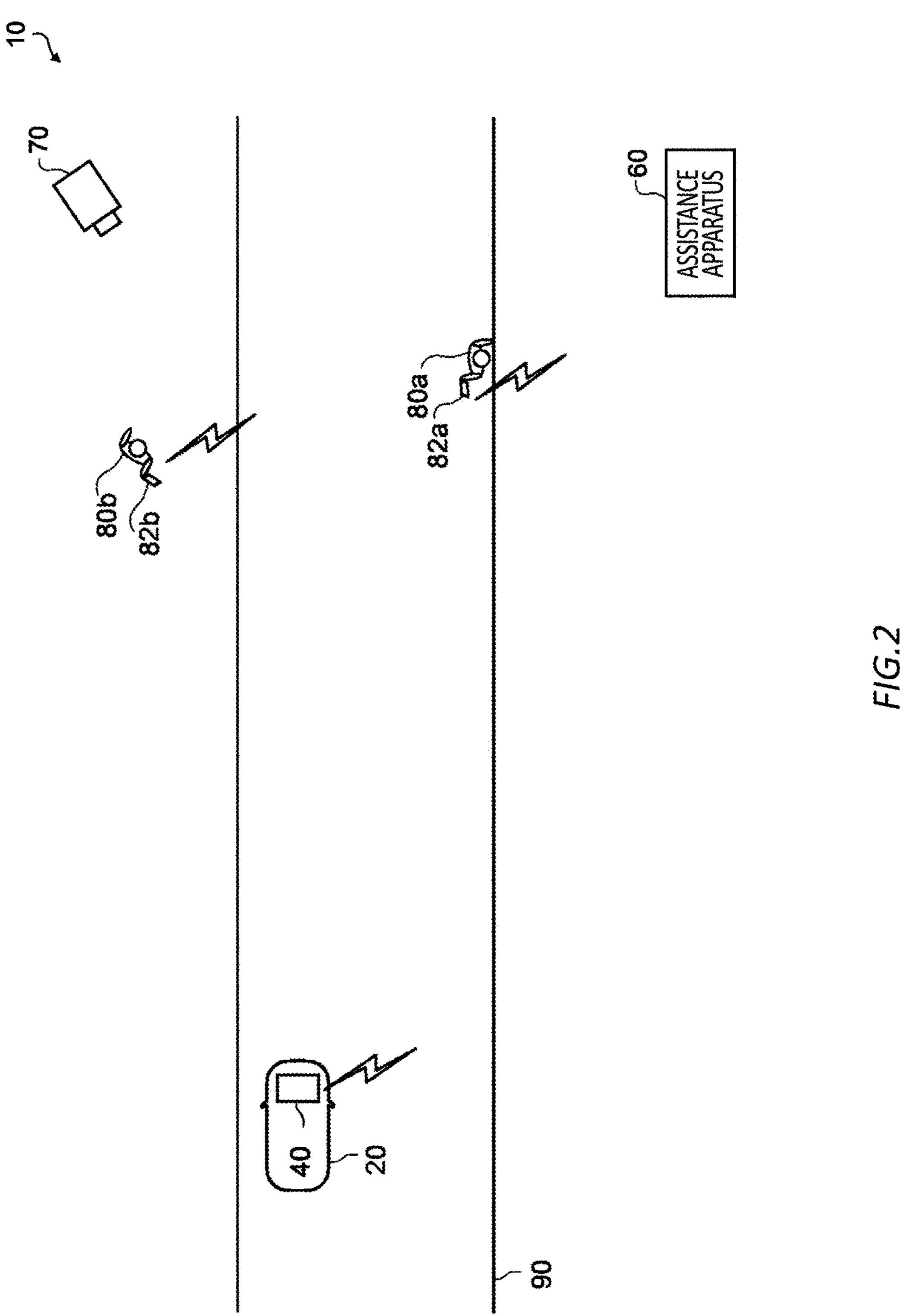
FIG. 2 shows a state in which a user 80*a* is attempting to move to an opposite side of a road 90 with respect to a position of a user 80*b*.

FIG. 2 shows a state in which the user 80*a* is attempting to move to an opposite side of the road 90 with respect to a position of the user 80*b*. The assistance apparatus 60 provides the traffic assistance for the vehicle 20 and/or the user 80*b* based on a position of the user terminal 82*b*, upon detecting that the user terminal 82*a* is moving toward the opposite side of the road 90, or that the user terminal 82*a* has moved to the opposite side of the road 90, from a history of position information of the user 80*a*. The traffic assistance for the vehicle 20 and/or the user 80*b* is provided based on the position of the user terminal 82*b* even after the user terminal 82*a* reaches the opposite side of the road 90.

For example, the assistance apparatus 60 determines whether the user 80*b* and the vehicle 20 may approach each other when the user terminal 82*b* moves toward the opposite side of the road 90, based on position information of the vehicle 20 received from the in-vehicle processing apparatus 40, the position information of the user terminal 82*b*, and map information showing a layout of the road 90. For example, the assistance apparatus 60 assumes that the user 80*b* has started moving toward the road 90, predicts a position of the user 80*b* and a position of the vehicle 20 when the user 80*b* reaches the road 90, and determines that the vehicle 20 and the user 80*b* may approach each other when a distance between the predicted position of the user 80*b* and the predicted position of the vehicle 20 is shorter than a predetermined value.

When the assistance apparatus 60 determines that the user 80*b* and the vehicle 20 may approach each other, the assistance apparatus 60 determines to provide the traffic assistance for the vehicle 20 and the user 80*b*, and instructs the in-vehicle processing apparatus 40 and the user terminal 82*b* to output a warning.

The image-capturing apparatus 70 acquires position information of each of the user 80*a* and the user 80*b* based on captured images, and transmits the acquired position information to the assistance apparatus 60. The assistance apparatus 60 may provide the traffic assistance for the traffic participant based on the position information of each of the user 80*a* and the user 80*b*. For example, the traffic assistance described above may be provided by using the position information of the user 80*a* instead of the position information of the user terminal 82*a* described above and using the position information of the user 80*b* instead of the position information of the user terminal 82*b*.

For example, if the user 80*a* and the user 80*b* are in a friend relationship and are walking together along the road 90, and when the user 80*a* moves to the opposite side of the road 90, the user 80*b* may also attempt to quickly move to the opposite side. According to the assistance system 10, the traffic assistance can be provided based on the position of the user 80*b* when the user 80*a* attempts to move to the opposite side of the road 90. In this manner, appropriate traffic assistance can be provided in a situation where a plurality of users are moving in conjunction with each other.

Figure 3:
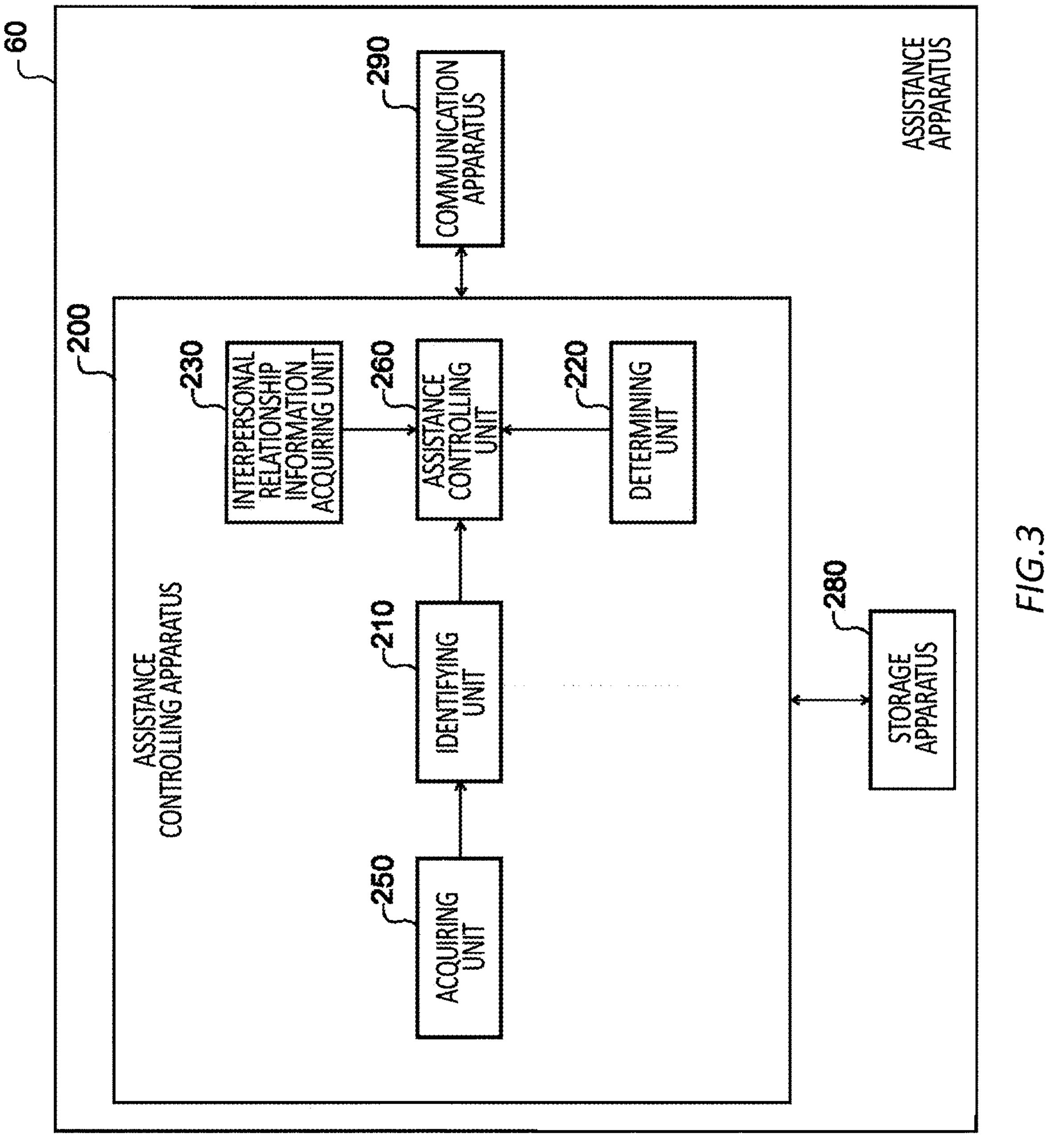
FIG. 3 shows a functional configuration of an assistance apparatus 60.

FIG. 3 shows a functional configuration of the assistance apparatus 60. The assistance apparatus 60 includes an assistance controlling apparatus 200, a communication apparatus 290, and a storage apparatus 280.

The communication apparatus 290 provides communication between the assistance apparatus 60 and each of the in-vehicle processing apparatus 40, the image-capturing apparatus 70, and the user terminal 82, based on control by the assistance controlling apparatus 200. The assistance controlling apparatus 200 is implemented by including, for example, a circuit such as an arithmetic processing apparatus including a processor. The assistance controlling apparatus 200 may be implemented by a microcomputer including a CPU, a ROM, a RAM, an I/O, a bus, and the like. The storage apparatus 280 is implemented by including a non-volatile storage medium. The assistance controlling apparatus 200 performs processing by using information stored in the storage apparatus 280. The storage apparatus 280 may store map information. The map information stored in the storage apparatus 280 may be used by the assistance controlling apparatus 200.

The assistance controlling apparatus 200 includes an acquiring unit 250, an identifying unit 210, the assistance controlling unit 260, an interpersonal relationship information acquiring unit 230, and a determining unit 220. It should be noted that an embodiment may be adopted in which the assistance apparatus 60 does not have some functions in the functional configuration shown in FIG. 2.

The acquiring unit 250 acquires position information of a plurality of user terminals 82 each being identical to the user terminal 82. The identifying unit 210 identifies, among the plurality of user terminals 82, a first user terminal 82 and a second user terminal 82 which are moving with at a distance of a predetermined value or less from each other, based on a history of position information of the plurality of user terminals 82. The assistance controlling unit 260 performs control related to assistance for the traffic participant when one of the first user terminal 82 or the second user terminal 82 is detected to move to an opposite side of a road with respect to a position of another of the first user terminal 82 or the second user terminal 82. In the present embodiment, the first user terminal 82 may be the user terminal 82*a*, and the second user terminal 82 may be the user terminal 82*b*.

The assistance controlling unit 260 performs control for causing a moving object which approaches a position of the second user terminal 82 to output a warning. For example, the assistance controlling unit 260 performs control for causing the vehicle 20 which approaches the position of the second user terminal 82 to output a warning.

The acquiring unit 250 may further acquire information indicating whether users associated with the plurality of user terminals 82 are speaking. The identifying unit 210 may identify, among the plurality of user terminals 82, the first user terminal 82 and the second user terminal 82 which are moving at the distance of the predetermined value or less from each other and with which users associated with each of the user terminal 82 are speaking alternately, based on the history of the position information of the plurality of user terminals 82.

For example, each of the plurality of user terminals 82 may acquire sound with a sound collecting apparatus included in each of the user terminal 82, and transmit information to the assistance apparatus 60 that the user 80 is speaking, when the acquired sound is determined to be sound of the user 80 who is registered as a user of the user terminal 82. The identifying unit 210 may identify a set of the first user terminal 82 and the second user terminal 82 with which users associated with each of the user terminal 82 are speaking alternately, based on the history of the position information of the plurality of user terminals 82.

The determining unit 220 determines whether current positions of the first user terminal 82 and the second user terminal 82 are points at which the first user terminal 82 and the second user terminal 82 start moving in different directions from each other, based on a history of position information of the first user terminal 82 and the second user terminal 82. The assistance controlling unit 260 reduces the assistance for the traffic participant when the current positions of the first user terminal 82 and the second user terminal 82 are identified by the determining unit 220 as points at which the first user terminal 82 and the second user terminal 82 start moving in the different directions from each other.

The interpersonal relationship information acquiring unit 230 acquires interpersonal relationship information indicating a degree of companionship among a plurality of users 80, each being identical to the user 80, associated with the plurality of user terminals 82. The assistance controlling unit 260 may enhance the assistance for the traffic participant more as the degree of companionship between a user associated with the first user terminal 82 and a user associated with the second user terminal 82 is higher.

The interpersonal relationship information acquiring unit 230 may acquire interpersonal relationship information indicating the degree of companionship between the plurality of users 80 associated with the plurality of user terminals 82, based on the history of the position information of the plurality of user terminals 82.

The interpersonal relationship information acquiring unit 230 acquires the interpersonal relationship information indicating an interpersonal relationship among the plurality of users 80 associated with the plurality of user terminals 82. The assistance controlling unit 260 may determine whether to enhance or reduce the assistance for the traffic participant according to the interpersonal relationship between the user associated with the first user terminal 82 and the user 80 associated with the second user terminal.

The interpersonal relationship information acquiring unit 230 may acquire information indicating a parent-child relationship between a first user 80 associated with the first user terminal 82 and a second user 80 associated with the second user terminal 82. The assistance controlling unit 260 performs the control related to the assistance for the traffic participant in a case where the user 80 associated with one of the first user terminal 82 or the second user terminal 82 is determined to be a parent of the user 80 associated with another of the first user terminal 82 or the second user terminal 82, based on information acquired by the interpersonal relationship information acquiring unit 230.

The assistance controlling unit 260 reduces the assistance for the traffic participant in a case where the user 80 associated with the one of the first user terminal 82 or the second user terminal 82 is determined to be a child of the user 80 associated with the another of the first user terminal 82 or the second user terminal 82, than in the case where the user 80 associated with the one of the first user terminal 82 or the second user terminal 82 is determined to be a parent of the user 80 associated with the another of the first user terminal 82 or the second user terminal 82, based on the information acquired by the interpersonal relationship information acquiring unit 230.

FIG. 4 shows one example of a data structure of position history information of the user terminal 82. The position history information is generated based on position information acquired from the user terminal 82 and stored in the storage apparatus 280. The position history information includes an ID, time, and position information as data items.

The ID indicates identification information of the user terminal 82. The time indicates time when position information was acquired. The position information indicates the position information of the user terminal 82. The position information may be, for example, latitude and longitude information of position of the user terminal 82.

FIG. 5 shows one example of a data structure of the interpersonal relationship information. The interpersonal relationship information is stored in the storage apparatus 280. The interpersonal relationship information includes a first ID, a second ID, an interpersonal relationship, and the degree of companionship as data items.

The first ID and the second ID indicates the identification information of the user terminal 82. The interpersonal relationship indicates the interpersonal relationship between the user 80 associated with the user terminal 82 which is identified by the first ID and the user 80 associated with the user terminal 82 which is identified by the second ID. The interpersonal relationship is, for example, parent and child, friends, and the like. In a case of a parent-child relationship, it may be assumed that the first ID indicates the identification information of the user terminal 82 associated with the user 80 who is a parent, and the second ID indicates the identification information of the user terminal 82 associated with the user 80 who is a child.

The interpersonal relationship may be determined by receiving interpersonal relationship setting information by the user 80. The interpersonal relationship may be determined based on the position history information. For example, the interpersonal relationship of users associated with the user terminal 82 positioned within a predetermined range at night may be determined to be a family. If age information of the user 80 is associated in advance with the identification information of the user terminal 82, it may be determined whether users are parent and child, based on the age information associated with the identification information of the user terminal 82 of the users identified as a family.

The degree of companionship indicates the degree of companionship between the user 80 associated with the user terminal 82 which is identified by the first ID and the user 80 associated with the user terminal 82 which is identified by the second ID. The degree of companionship may be determined based on the position history information. For example, based on movement history information, the degree of companionship may be determined to be either of “high,” “medium,” or “low” according to a frequency at which the user 80 associated with the user terminal 82 which is identified by the first ID and the user 80 associated with the user terminal 82 which is identified by the second ID move together. The degree of companionship may be determined to be “highest” if the interpersonal relationship is parent and child.

FIG. 6 shows one example of a data structure of separation point information. The separation point information is stored in the storage apparatus 280. The separation point information includes the first ID, the second ID, a separation point, and a separation time period as data items.

The first ID and the second ID indicates the identification information of the user terminal 82. The separation point indicates a point at which the user terminal 82 identified by the first ID and the user terminal 82 identified by the second ID start moving in different directions. The separation time period indicates a time period when the user terminal 82 identified by the first ID and the user terminal 82 identified by the second ID start moving in different directions at the separation point.

For example, the determining unit 220 refers to the position history information to identify a set of the user terminal 82 which starts moving in different directions from each other after moving over a predetermined distance at the predetermined distance from each other, and identify a position and time at which the user terminal 82 start moving in different directions from each other. Based on the identified position and time, the determining unit 220 determines a point and a time period at which the user terminal 82 start moving in different directions with a frequency exceeding a predetermined frequency in a past. The storage apparatus 280 sets the identification information of the set of user terminal 82 identified by the determining unit 220 as the first ID and the second ID, and sets the point and the time period determined by the determining unit 220 as the separation point and the separation time period, respectively, to store them in association with each other as the separation point information.

When the user terminal 82*a* is detected to move to the opposite side of the road 90 with respect to the position of the user terminal 82*b*, the determining unit 220 refers to the separation point information stored in the storage apparatus 280 to acquire the separation point and separation time associated with the identification information of the user terminal 82*a* and the identification information of the user terminal 82*b*. When a current position of the user terminal 82*b* is positioned within a predetermined range including the acquired separation point, and current time is within a predetermined time range including the separation time period, the determining unit 220 determines that it is a point at which the user terminal 82*a* and the user terminal 82*b* start moving in different directions from each other. In this case, the assistance controlling unit 260 reduces the assistance for the traffic participant. This can ensure that unnecessary assistance is not provided, for example, at points where people are sent off on a daily basis.

Figure 7:
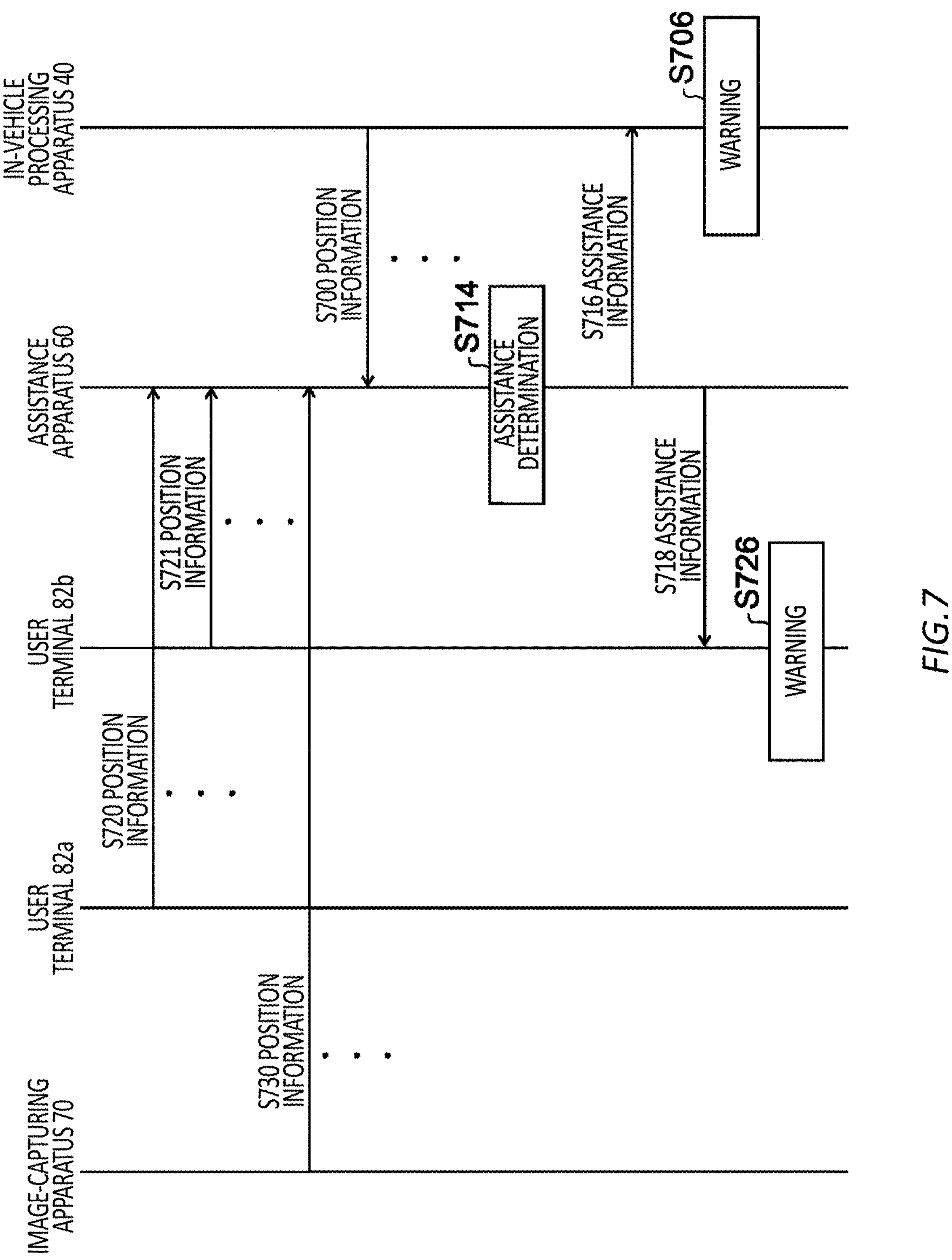
FIG. 7 shows one example of an execution sequence of processing performed in an image-capturing apparatus 70, the user terminal 82, an in-vehicle processing apparatus 40 included in a vehicle 20, and the assistance apparatus 60.

FIG. 7 shows one example of an execution sequence of processing performed in the image-capturing apparatus 70, the user terminal 82, the in-vehicle processing apparatus 40 included in the vehicle 20, and the assistance apparatus 60.

At S720, the user terminal 82*a* transmits, to the assistance apparatus 60, position information indicating a current position of the user terminal 82*a* which is based on a signal received from the GNSS satellite, together with the identification information of the user terminal 82*a*. Transmission of the position information and the identification information from the user terminal 82*a* to the assistance apparatus 60 is periodically performed. The user terminal 82*a* may transmit, to the assistance apparatus 60, information indicating whether its user is speaking, together with the position information.

At S721, the user terminal 82*b* transmits, to the assistance apparatus 60, position information indicating the current position of the user terminal 82*b* which is based on a signal received from the GNSS satellite, together with the identification information of the user terminal 82*b*. Transmission of the position information and the identification information from the user terminal 82*b* to the assistance apparatus 60 is periodically performed. The user terminal 82*b* may transmit, to the assistance apparatus 60, information indicating whether its user is speaking, together with the position information.

At S730, the image-capturing apparatus 70 transmits, to the assistance apparatus 60, position information indicating a position of the user 80 which is acquired by analyzing images captured by the image-capturing apparatus 70. Transmission of the position information of the user 80 from the image-capturing apparatus 70 to the assistance apparatus 60 is periodically performed.

At S700, the in-vehicle processing apparatus 40 transmits the position information of the vehicle 20 to the assistance apparatus 60. Transmission of the position information from the in-vehicle processing apparatus 40 to the assistance apparatus 60 is periodically performed.

At S714, the assistance controlling unit 260 of the assistance apparatus 60 determines whether to provide the traffic assistance for the vehicle 20 and the user terminal 82, based on the position information of the user terminal 82 acquired from the user terminal 82 and/or the position information of the user terminal 82 acquired from the image-capturing apparatus 70, the position information of the vehicle 20 acquired from the in-vehicle processing apparatus 40, and the map information.

For example, based on a history of the position information of the user terminal 82 and the map information, when the user terminal 82*b* moves to the opposite side of the road 90 after the user terminal 82*a* and the user terminal 82*b* have moved over a predetermined distance at the predetermined distance or less from each other, the assistance controlling unit 260 determines to provide the assistance based on the position of the user terminal 82*b* and the position of the vehicle 20. The assistance controlling unit 260 determines to provide the assistance if a future position of the vehicle 20 is predicted to approach a future position of the user terminal 82*b* within a predetermined time.

If it is determined that the assistance is to be provided, at S716, the assistance controlling unit 260 transmits, to the in-vehicle processing apparatus 40, assistance information instructing to output a warning, by controlling the communication apparatus 290. Further, at S718, the assistance controlling unit 260 transmits, to at least the user terminal 82*b*, the assistance information instructing to output a warning, by controlling the communication apparatus 290.

Upon receiving the assistance information from the assistance apparatus 60, at S706, the in-vehicle processing apparatus 40 notifies, in accordance with the assistance information, an occupant of the vehicle 20 to beware of a pedestrian running out into the road 90, with a Human Machine Interface (HMI) function included in the in-vehicle processing apparatus 40. The in-vehicle processing apparatus 40 may notify an occupant of the vehicle 20 to beware of a pedestrian running out into the road 90 with sound and through display on a display apparatus included in the vehicle 20.

Upon receiving the assistance information from the assistance apparatus 60, at S726, the user terminal 82*b* notifies the user 80*b* of a presence of the vehicle 20 approaching the user 80*b*, with the HMI function included in the user terminal 82*b*. The user terminal 82*b* may notify the user 80*b* of a presence of a vehicle approaching the user 80*b* with sound.

Figure 8:
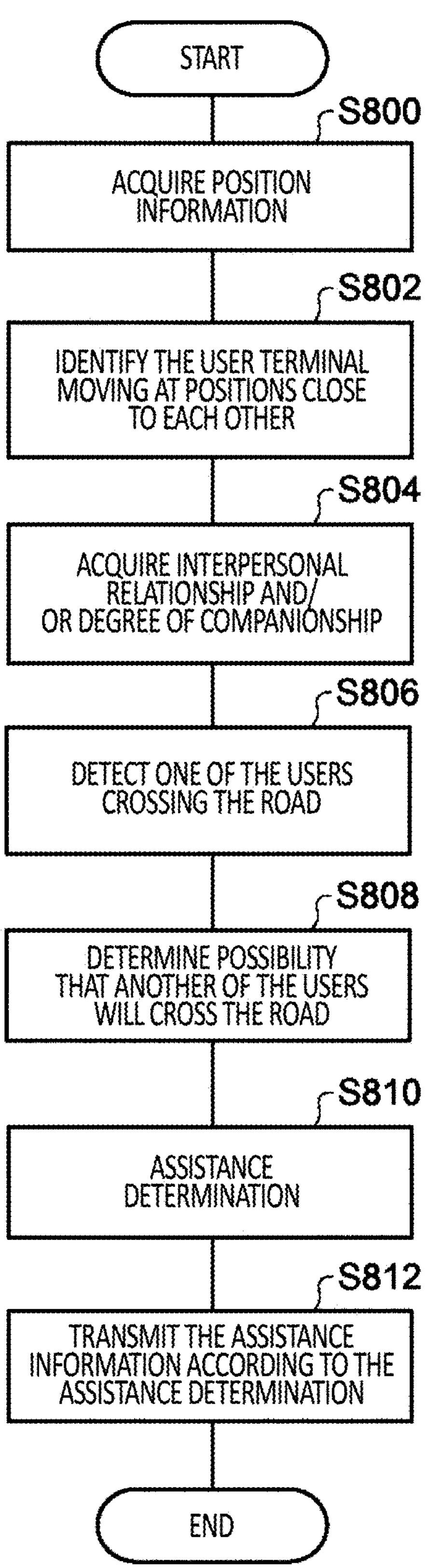
FIG. 8 shows one example of a flowchart regarding processing according to the assistance controlling method executed in an assistance controlling apparatus 200.

FIG. 8 shows one example of a flowchart regarding processing according to an assistance controlling method executed in the assistance controlling apparatus 200.

At S800, the acquiring unit 250 acquires the position information of the user terminal 82. The acquiring unit 250 may acquire position information transmitted from the user terminal 82. The acquiring unit 250 may acquire the position information of the user 80 recognized by the image-capturing apparatus 70 and transmitted from the image-capturing apparatus 70 as the position information of the user terminal 82.

At S802, the identifying unit 210 identifies the first user terminal 82 and second user terminal 82 which are moving with positions close to each other, based on the position information of the user terminal 82. The identifying unit 210 identifies the first user terminal 82 and the second user terminal 82 which are moving over a predetermined time while maintaining a positional relation in which a distance between each other is shorter than a predetermined value. The identifying unit 210 may identify the first user terminal 82 and the second user terminal 82 with which users of each of the user terminal 82 are alternately speaking for a longer time than a predetermined time, based on information indicating whether they are speaking which is transmitted from the user terminal 82.

At S804, the interpersonal relationship information acquiring unit 230 acquires an interpersonal relationship and/or a degree of companionship between the user 80 of the first user terminal 82 and the user of the second user terminal 82 identified at S802. The interpersonal relationship information acquiring unit 230 refers to the interpersonal relationship information stored in the storage apparatus 280 to acquire the interpersonal relationship and/or the degree of companionship.

At S806, the assistance controlling unit 260 determines whether the user 80 of one of the first user terminal 82 or the second user terminal 82 identified at S802 have crossed the road 90.

At S808, the assistance controlling unit 260 determines a possibility that the user 80 of the another of the first user terminal 82 or the second user terminal 82 identified at S802 will cross the road 90. For example, based on the interpersonal relationship information acquired at S804, the assistance controlling unit 260 determines a possibility of crossing, which is the possibility that the user 80 of the another of the first user terminal 82 or the second user terminal 82 will cross the road 90, according to the interpersonal relationship between the user 80 of the another of the first user terminal 82 or the second user terminal 82 and the user 80 of the one of the first user terminal 82 or the second user terminal 82. The assistance controlling unit 260 may determine that the possibility of crossing is higher if the interpersonal relationship between the user 80 of the another of the first user terminal 82 or the second user terminal 82 and the user 80 of the one of the first user terminal 82 or the second user terminal 82 is a friend relationship. The assistance controlling unit 260 may determine that the possibility of crossing is higher if the interpersonal relationship between the user 80 of the another of the first user terminal 82 or the second user terminal 82 and the user 80 of the one of the first user terminal 82 or the second user terminal 82 is a parent-child relationship. The assistance controlling unit 260 may determine that the possibility of crossing is higher if the user 80 of the another of the first user terminal 82 or the second user terminal 82 is a child of the user 80 of the one of the first user terminal 82 or the second user terminal 82. The assistance controlling unit 260 may determine that the possibility of crossing is higher as the degree of companionship between the user 80 of the one of the first user terminal 82 or the second user terminal 82 and the user 80 of the another of the first user terminal 82 or the second user terminal 82 is higher.

The assistance controlling unit 260 may refer to a separation point of time stored in the storage apparatus 280 to determine the possibility of crossing. The assistance controlling unit 260 may refer to a separation position and the separation time period associated with the identification information of the one of the first user terminal 82 or the second user terminal 82 and the identification information of the another of the first user terminal 82 or the second user terminal 82 to determine that the possibility of crossing is low when a current position of the another of the first user terminal 82 or the second user terminal 82 is within a predetermined range which includes the separation position. In this case, the possibility of crossing may be determined to be even lower if the current time is within the predetermined time range which includes the separation time period.

At S810, the assistance controlling unit 260 determines whether to perform the assistance for the traffic participant. If the possibility of crossing determined at S808 is higher than a predetermined value, the assistance controlling unit 260 predicts the future position of the vehicle 20 and a future position of the another of the first user terminal 82 or the second user terminal 82 within a predetermined time from a present. Based on the predicted future position of the vehicle 20 and the future position of the another of the first user terminal 82 or the second user terminal 82, the assistance controlling unit 260 determines to provide the assistance for the traffic participant if the vehicle 20 and the another of the first user terminal 82 or the second user terminal 82 are predicted to approach each other.

At S812, the assistance controlling unit 260 transmits the assistance information to the vehicle 20 and/or the another of the first user terminal 82 or the second user terminal 82, according to the determination at S810.

According to the assistance system 10 described above, when users who are friends with each other or parent and child with each other move while walking, and one of the users moves to the opposite side of the road, the traffic assistance can be provided based on a position of another of the user. In this manner, the appropriate traffic assistance can be provided in the situation where a plurality of users are moving in conjunction with each other.

Figure 9:
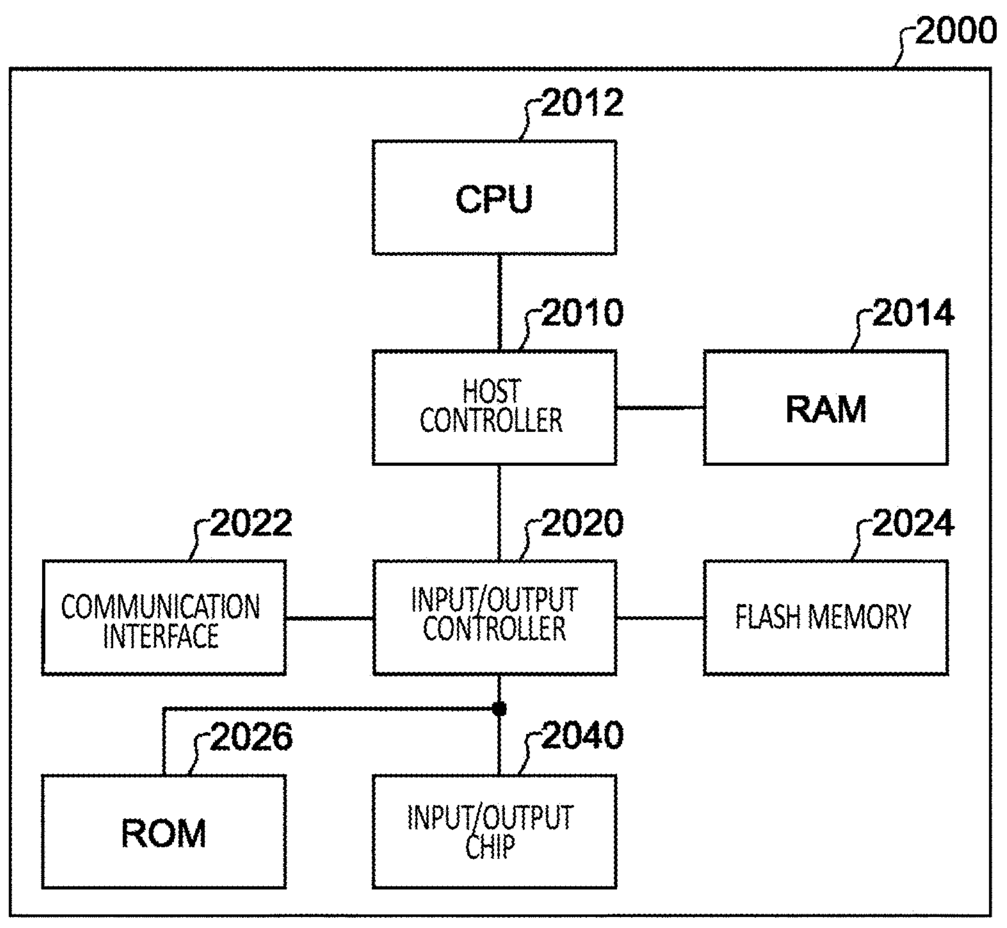
FIG. 9 shows an example of a computer 2000.

FIG. 9 shows an example of a computer 2000 in which a plurality of embodiments of the present invention can be entirely or partially embodied. A program installed on the computer 2000 can cause the computer 2000 to function as an apparatus such as the assistance apparatus 60 according to the embodiments or each unit of the apparatus, to execute operations associated with the apparatus or each unit of the apparatus, and/or to execute a process according to the embodiments or a step of the process. Such a program may be executed by a CPU 2012 in order to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, and thereby controls each unit.

The communication interface 2022 communicates with another electronic device via a network. The flash memory 2024 stores a program and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a USB port, a HDMI (registered trademark) port.

A program is provided via a network or a computer-readable storage medium such as a CD-ROM, a DVD-ROM, or a memory card. The RAM 2014, the ROM 2026, or the flash memory 2024 is an example of the computer-readable storage medium. The programs are installed in the flash memory 2024, the RAM 2014, or the ROM 2026, and executed by the CPU 2012. Information processing written in these programs is read by the computer 2000, and provides cooperation between the programs and the various types of hardware resources described above. An apparatus or a method may be actualized by executing operations or processing of information according to a use of the computer 2000.

For example, when a communication is executed between the computer 2000 and an external device, the CPU 2012 may execute a communication program loaded in the RAM 2014, and instruct the communication interface 2022 to execute communication processing based on processing written in the communication program. Under the control of the CPU 2012, the communication interface 2022 reads transmission data stored in a transmission buffer processing region provided in a recording medium such as the RAM 2014 and the flash memory 2024, transmits the read transmission data to the network, and writes reception data received from the network into a reception buffer processing region or the like provided on the recording medium.

In addition, the CPU 2012 may cause all or a necessary portion of a file or a database stored in a recording medium such as the flash memory 2024 and the like to be read into the RAM 2014, and execute various kinds of processing on the data on the RAM 2014. Next, the CPU 2012 writes back the processed data into the recording medium.

Various types of information such as various types of programs, data, a table, and a database may be stored in the recording medium and may be subjected to information processing. The CPU 2012 may execute, on the data read from the RAM 2014, various kinds of processing including various kinds of operations, information processing, conditional judgement, conditional branching, unconditional branching, information retrieval/replacement, or the like described herein and specified by instruction sequences of the programs, and write back a result into the RAM 2014. In addition, the CPU 2012 may retrieve information in a file, a database, or the like in the recording medium. For example, when multiple entries each having an attribute value of a first attribute associated with an attribute value of a second attribute, is stored in the recording medium, the CPU 2012 may retrieve an entry having a designated attribute value of the first attribute that matches a condition from among these multiple entries, and read the attribute value of the second attribute stored in this entry, thereby acquiring the attribute value of the second attribute associated with the first attribute that satisfies a predetermined condition.

The programs or software modules described above may be stored in the computer-readable storage medium on the computer 2000 or in the vicinity of the computer 2000. A recording medium such as a hard disk or a RAM provided in a server system connected to a dedicated communication network or the Internet can be used as the computer-readable storage medium. A program stored in the computer-readable storage medium may be provided to the computer 2000 via a network.

The program which is installed on the computer 2000 and causes the computer 2000 to function as the assistance apparatus 60 may act on the CPU 2012 and the like to cause the computer 2000 to separately function as each unit of the assistance apparatus 60 (e.g., the assistance controlling apparatus 200, and the like). The information processing written in these programs is read by the computer 2000 to function as each unit of the assistance apparatus 60, which is the specific means in which the software and various kinds of hardware resources described above cooperate. These specific means realize arithmetic operations or processing of information according to the intended use of the computer 2000 in the present embodiment, and the assistance apparatus 60 is thereby constructed to be specific according to the intended use.

Various embodiments have been described with reference to the block diagrams and the like. In the block diagrams, each block may represent (1) a stage of a process in which an operation is executed, or (2) each unit of the apparatus having a role in executing the operation. A specific stage and each unit may be implemented by a dedicated circuit, a programmable circuit supplied with computer-readable instructions stored on a computer-readable storage medium, and/or a processor supplied with computer-readable instructions stored on a computer-readable storage medium. The dedicated circuit may include a digital and/or analog hardware circuit, or may include an integrated circuit (IC) and/or a discrete circuit. The programmable circuit may include a reconfigurable hardware circuit including such as logical AND, logical OR, logical XOR, logical NAND, logical NOR, and another logical operation, and a memory element such as a flip-flop, a register, a field programmable gate array (FPGA), a programmable logic array (PLA), or the like.

The computer-readable storage medium may include any tangible device capable of storing instructions to be executed by an appropriate device, and as a result, the computer-readable storage medium having instructions stored therein forms at least a part of a product including instructions which can be executed to provide means for executing processing procedures or operations specified in the block diagrams. Examples of the computer-readable storage medium may include an electronic storage medium, a magnetic storage medium, an optical storage medium, an electromagnetic storage medium, a semiconductor storage medium, and the like. More specific examples of the computer-readable storage medium may include a floppy disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disc (DVD), a Blu-ray (registered trademark) disc, a memory stick, an integrated circuit card, or the like.

The computer-readable instructions may include an assembler instruction, an instruction-set-architecture (ISA) instruction, a machine instruction, a machine dependent instruction, a microcode, a firmware instruction, state-setting data, or either of source code or object code written in any combination of one or more programming languages including an object oriented programming language such as Smalltalk (registered trademark), JAVA (registered trademark), and C++, etc., and a conventional procedural programming language such as a "C" programming language or a similar programming language.

Computer-readable instructions may be provided to a processor of a general purpose computer, a special purpose computer, or another programmable data processing apparatus, or to programmable circuit, locally or via a local area network (LAN), wide area network (WAN) such as the Internet, or the like, and a computer-readable instruction may be executed to provide means for executing operations specified in the described processing procedures or block diagrams. Examples of the processor include a computer processor, a processing unit, a microprocessor, a digital signal processor, a controller, a microcontroller, and the like.

While the present invention has been described above by using the embodiments, the technical scope of the present invention is not limited to the scope of the above-described embodiments. It is apparent to persons skilled in the art that various alterations or improvements can be made to the above-described embodiments. It is apparent from description of the claims that the embodiments to which such alterations or improvements are made can also be included in the technical scope of the present invention.

It should be noted that order of execution of each process such as the operations, procedures, steps, and stages, etc. performed in an apparatus, system, program, and method shown in the claims, specification, or diagrams can be implemented in any order as long as the order is not specifically indicated by "before", "prior to", or the like and as long as the output from a previous process is not used in a later process. Even if the operation flow is described by using phrases such as "first" or "next" for the sake of convenience in the claims, specification, or drawings, it does not necessarily mean that the process must be performed in this order.

EXPLANATION OF REFERENCES

10: assistance system
20: vehicle
40: in-vehicle processing apparatus
60: assistance apparatus
70: image-capturing apparatus
80: user
82: user terminal
90: road
200: assistance controlling apparatus
210: identifying unit
220: determining unit
230: interpersonal relationship information acquiring unit
250: acquiring unit
260: assistance controlling unit
280: storage apparatus
290: communication apparatus
2000: computer
2010: host controller
2012: CPU
2014: RAM
2020: input/output controller;
2022: communication interface
2024: flash memory
2026: ROM
2040: input/output chip.

What is claimed is:

1. An assistance controlling apparatus comprising:

at least one processor;

an acquiring unit that uses the at least one processor to acquire position information of a plurality of user terminals;

an identifying unit that uses the at least one processor to identify, among the plurality of user terminals, a first user terminal and a second user terminal which are moving at a distance of a predetermined value or less from each other, based on a history of position information of the plurality of user terminals; and an assistance controlling unit that uses the at least one processor to perform control related to assistance for a traffic participant when one of the first user terminal or the second user terminal is detected to move to an opposite side of a road with respect to a position of an other of the first user terminal or the second user terminal, the assistance controlling apparatus further comprises a determining unit that uses the at least one processor to determine whether current positions of the first user terminal and the second user terminal are points at which the first user terminal and the second user terminal start moving in different directions from each other, based on the history of the position information of the first user terminal and the second user terminal, wherein the assistance controlling unit reduces the assistance for the traffic participant when the current positions of the first user terminal and the second user terminal are identified by the determining unit as points at which the first user terminal and the second user terminal start moving in the different directions from each other.

2. The assistance controlling apparatus according to claim 1, wherein the assistance controlling unit performs control for causing a moving object which approaches a position of the second user terminal to output a warning.

3. The assistance controlling apparatus according to claim 2, wherein the acquiring unit further acquires information indicating whether users associated with the plurality of user terminals are speaking, and the identifying unit identifies, among the plurality of user terminals, the first user terminal and the second user terminal which are moving at the distance of the predetermined value or less from each other, and with which the users associated with each of the user terminals are speaking alternately, based on the history of position information of the plurality of user terminals.

4. The assistance controlling apparatus according to claim 2, further comprising an interpersonal relationship information acquiring unit that uses the at least one processor to acquire interpersonal relationship information indicating a degree of companionship among a plurality of users associated with the plurality of user terminals, wherein the assistance controlling unit enhances assistance for the traffic participant more as the degree of companionship between a user associated with the first user terminal and a user associated with the second user terminal is higher.

5. The assistance controlling apparatus according to claim 4, wherein the interpersonal relationship information acquiring unit acquires the interpersonal relationship information indicating the degree of companionship between the plurality of users associated with the plurality of user terminals, based on the history of position information of the plurality of user terminals.

6. The assistance controlling apparatus according to claim 2, further comprising an interpersonal relationship information acquiring unit that uses the at least one processor to acquire interpersonal relationship information indicating an interpersonal relationship among a plurality of users associated with the plurality of user terminals, wherein the assistance controlling unit determines whether to enhance or reduce assistance for the traffic participant according to the interpersonal relationship between a user associated with the first user terminal and a user associated with the second user terminal.

7. The assistance controlling apparatus according to claim 2, further comprising an interpersonal relationship information acquiring unit that uses the at least one processor to acquire information indicating a parent-child relationship between a first user associated with the first user terminal and a second user associated with the second user terminal, wherein the assistance controlling unit performs control related to assistance for the traffic participant in a case where a user associated with the one of the first user terminal or the second user terminal is determined to be a parent of a user associated with the other of the first user terminal or the second user terminal, based on information acquired by the interpersonal relationship information acquiring unit.

8. The assistance controlling apparatus according to claim 7, wherein the assistance controlling unit reduces the assistance for the traffic participant in a case where the user associated with the one of the first user terminal or the second user terminal is determined to be a child of the user associated with the other of the first user terminal or the second user terminal, than in the case where the user associated with the one of the first user terminal or the second user terminal is determined to be the parent of the user associated with the other of the first user terminal or the second user terminal, based on the information acquired by the interpersonal relationship information acquiring unit.

9. The assistance controlling apparatus according to claim 1, wherein the acquiring unit further acquires information indicating whether users associated with the plurality of user terminals are speaking, and the identifying unit identifies, among the plurality of user terminals, the first user terminal and the second user terminal which are moving at the distance of the predetermined value or less from each other and with which the users associated with each of the user terminals are speaking alternately, based on the history of the position information of the plurality of user terminals.

10. The assistance controlling apparatus according to claim 9, further comprising an interpersonal relationship information acquiring unit that uses the at least one processor to acquire interpersonal relationship information indicating a degree of companionship among a plurality of users associated with the plurality of user terminals, wherein the assistance controlling unit enhances assistance for the traffic participant more as the degree of companionship between a user associated with the first user terminal and a user associated with the second user terminal is higher.

11. The assistance controlling apparatus according to claim 1, further comprising an interpersonal relationship information acquiring unit that uses the at least one processor to acquire interpersonal relationship information indicating an interpersonal relationship among a plurality of users associated with the plurality of user terminals, wherein the assistance controlling unit determines whether to enhance or reduce the assistance for the traffic participant according to the interpersonal relationship between a user associated with the first user terminal and a user associated with the second user terminal.

12. The assistance controlling apparatus according to claim 1, further comprising an interpersonal relationship information acquiring unit that uses the at least one processor to acquire information indicating a parent-child relationship between a first user associated with the first user terminal and a second user associated with the second user terminal, wherein the assistance controlling unit performs the control related to the assistance for the traffic participant in a case where a user associated with the one of the first user terminal or the second user terminal is determined to be a parent of a user associated with the other of the first user terminal or the second user terminal, based on information acquired by the interpersonal relationship information acquiring unit.

13. The assistance controlling apparatus according to claim 12, wherein the assistance controlling unit reduces the assistance for the traffic participant in a case where the user associated with the one of the first user terminal or the second user terminal is determined to be a child of the user associated with the other of the first user terminal or the second user terminal, than in the case where the user associated with the one of the first user terminal or the second user terminal is determined to be the parent of the user associated with the other of the first user terminal or the second user terminal, based on the information acquired by the interpersonal relationship information acquiring unit.

14. An assistance controlling apparatus comprising:

at least one processor;

an acquiring unit that uses the at least one processor to acquire position information of a plurality of user terminals;

an identifying unit that uses the at least one processor to identify, among the plurality of user terminals, a first user terminal and a second user terminal which are moving at a distance of a predetermined value or less from each other, based on a history of position information of the plurality of user terminals; and an assistance controlling unit that uses the at least one processor to perform control related to assistance for a traffic participant when one of the first user terminal or the second user terminal is detected to move to an opposite side of a road with respect to a position of an other of the first user terminal or the second user terminal, the assistance controlling apparatus further comprises an interpersonal relationship information acquiring unit that uses the at least one processor to acquire interpersonal relationship information indicating a degree of companionship among a plurality of users associated with the plurality of user terminals, wherein the assistance controlling unit enhances the assistance for the traffic participant more as the degree of companionship between a user associated with the first user terminal and a user associated with the second user terminal is higher.

15. The assistance controlling apparatus according to claim 14, wherein the interpersonal relationship information acquiring unit acquires the interpersonal relationship information indicating the degree of companionship between the plurality of users associated with the plurality of user terminals, based on the history of position information of the plurality of user terminals.

16. An assistance controlling method comprising:

acquiring position information of a plurality of user terminals;

identifying, among the plurality of user terminals, a first user terminal and a second user terminal which are moving at a distance of a predetermined value or less from each other, based on a history of position information of the plurality of user terminals; and performing control related to assistance for a traffic participant when one of the first user terminal or the second user terminal is detected to move to an opposite side of a road with respect to a position of an other of the first user terminal or the second user terminal, the assistance controlling method further comprises determining whether current positions of the first user terminal and the second user terminal are points at which the first user terminal and the second user terminal start moving in different directions from each other, based on the history of the position information of the first user terminal and the second user terminal, wherein the performing control includes reducing the assistance for the traffic participant when the current positions of the first user terminal and the second user terminal are identified as points at which the first user terminal and the second user terminal start moving in the different directions from each other.

17. A non-transitory computer-readable storage medium which stores a program, wherein the program causes a computer to function as:

an acquiring unit that uses the computer to acquire position information of a plurality of user terminals;

an identifying unit that uses the computer to identify, among the plurality of user terminals, a first user terminal and a second user terminal which are moving at a distance of a predetermined value or less from each other, based on a history of position information of the plurality of user terminals; and an assistance controlling unit that uses the computer to perform control related to assistance for a traffic participant when one of the first user terminal or the second user terminal is detected to move to an opposite side of a road with respect to a position of an other of the first user terminal or the second user terminal, the assistance controlling apparatus further comprises a determining unit that uses the computer to determine whether current positions of the first user terminal and the second user terminal are points at which the first user terminal and the second user terminal start moving in different directions from each other, based on the history of the position information of the first user terminal and the second user terminal, wherein the assistance controlling unit reduces the assistance for the traffic participant when the current positions of the first user terminal and the second user terminal are identified by the determining unit as points at which the first user terminal and the second user terminal start moving in the different directions from each other.

* * * * *